(12) United States Patent
Fotinatos et al.

(10) Patent No.: US 10,152,687 B2
(45) Date of Patent: Dec. 11, 2018

(54) APPLICATION DIRECTORY

(75) Inventors: Perry Fotinatos, Allendale, NJ (US);
James M. Bessette, Hoboken, NJ (US);
Melvin Lew, New York, NY (US);
Syed Husain, Hewlett, NY (US)

(73) Assignee: Goldman Sachs & Co. LLC, New York, NY (US)

(*) Notice: Subject to any disclaimer, the term of this patent is extended or adjusted under 35 U.S.C. 154(b) by 661 days.

(21) Appl. No.: 11/566,033

(22) Filed: Dec. 1, 2006

(65) Prior Publication Data

US 2008/0133594 A1    Jun. 5, 2008

(51) Int. Cl.
*G06Q 10/06* (2012.01)
*G06Q 10/08* (2012.01)

(52) U.S. Cl.
CPC .................. *G06Q 10/087* (2013.01)

(58) Field of Classification Search
USPC .......................................... 705/28; 715/764
See application file for complete search history.

(56) References Cited

U.S. PATENT DOCUMENTS

| | | | | |
|---|---|---|---|---|
| 6,650,346 B1 * | 11/2003 | Jaeger | G06F 17/30722 | 705/28 |
| 7,035,877 B2 * | 4/2006 | Markham | B23Q 35/12 | |
| 8,548,938 B2 * | 10/2013 | Amaru | G06F 17/30557 | 707/603 |
| 8,549,036 B2 * | 10/2013 | O'Connor | G06Q 10/06313 | 707/603 |
| 2001/0056386 A1 * | 12/2001 | O'Halloran | G06F 11/2289 | 705/28 |
| 2003/0036983 A1 * | 2/2003 | Hougen | G06Q 10/087 | 705/28 |
| 2003/0061123 A1 * | 3/2003 | McMenimen | A61N 1/08 | 705/28 |
| 2003/0128991 A1 * | 7/2003 | Carling | H04N 1/00127 | 399/8 |
| 2004/0002905 A1 * | 1/2004 | Oya | G06Q 10/087 | 705/28 |
| 2005/0027571 A1 * | 2/2005 | Gamarnik | G06Q 40/08 | 705/4 |
| 2005/0138074 A1 * | 6/2005 | O'Connor | G06Q 10/06 | |
| 2006/0064666 A1 * | 3/2006 | Amaru | G06F 17/30557 | 717/100 |
| 2007/0016822 A1 * | 1/2007 | Rao | G06F 9/5061 | 714/4.11 |
| 2008/0183483 A1 * | 7/2008 | Hart | G06F 17/5004 | 705/1.1 |

* cited by examiner

*Primary Examiner* — Talia F Crawley

(57) ABSTRACT

Building and maintaining an accurate and up-to-date inventory of applications deployed throughout an organization are described. In one aspect, an application directory facilitates automated and standardized entry of information on an application. The application directory provides a series of browser-rendered interfaces that collects data about the application. These different types of data are organized according to a logical data model that defines multiple hierarchical levels of data types and relationships amongst the hierarchical levels. The collection of registered applications forms an inventory that may be used to manage these assets. In another aspect, the application directory allows authorized users to manage the inventory of applications.

36 Claims, 12 Drawing Sheets

Register Application — 800

Application Directory — Welcome Jones, Mary

Tabs: Intranet Home Page | Application Directory

Sidebar:
- App Directory Home Page
- Register Application
- Modify
- Portfolio Reports
  - By Tier
  - By Location
  - By Division
  - By Category
  - By Status

722

Register Application: Deployment Data (step 2 of 5) — 802

| Field | Value | |
|---|---|---|
| Physical Location | New York | 804 |
| Deployment Name | App Dir -- New York | 806 |
| AID | 5000 | 808 |
| Tier | 4 ▼ | 810 |
| Next Tech Test Date | ▼ | 812 |
| Deployment Manager | Jones, Mary [Select] | 814 |
| LifeLine ROTAs | [ ] [Add ROTA] [Remove ROTA] | 816 |
| Servers | 818 [Add Server] [Remove Server] | |

4 items found, displaying all items

| ASSET TAG | HOSTNAME | LOCATION | MAKE/MODEL | PLATFORM (OS) |
|---|---|---|---|---|
| 296340 | host1.org.com | New York | ProLiant DL580 | Linux AS |
| 298356 | host2.org.com | San Fran | ProLiant DL580 | Linux AS |
| : | : | : | : | : |

Register Application — 1100

Application Directory — Welcome Jones, Mary

Register Application: BCP Audit Data (step 5 of 5) — 1102

- Technology Tested [Date ▼] — 1104
- User Tested [Date ▼] — 1106
- Connectivity Tested [Date ▼] — 1108

BCP Comments: Tier is unknown at this time — 1110

722

Sidebar:
- App Directory Home Page
- Register Application
- Modify
- Portfolio Reports
  - By Tier
  - By Location
  - By Division
  - By Category
  - By Status

[Back] [Approve] [Reject] — 1112 / 1114

Fig. 11

APPLICATION DIRECTORY

TECHNICAL FIELD

This disclosure relates to building, maintaining, and managing an inventory of applications and related assets deployed throughout an organization.

BACKGROUND

In the wake of recent disasters—both natural and manmade—business continuity planning has become increasingly important to many organizations. Disasters such as floods, hurricanes, tsunamis, tornadoes, terrorist attacks, prolonged power outages, and the like can cause significant disruptions to an organization. Business continuity planning (or BCP) is a methodology used to create a plan for how an organization will resume partially or completely interrupted critical function(s) within a predetermined time after a disaster or disruption. BCP was used in many industries to anticipate and handle potential computing problems introduced by crossing into the new millennium in 2000, a situation generally known as the Y2k problem. Regulatory agencies subsequently required certain important industries-power, telecommunication, health, and financial—to formalize BCP manuals to protect the public. Those new regulations are often based on the formalized standards defined under ISO/IEC 17799 or BS 7799.

Although business focus on BCP arguably waned somewhat following the Y2K transition (mainly due to its success), the lack of interest unequivocally ended on Sep. 11, 2001, when simultaneous terrorist attacks devastated lower New York City. Many critical functions for many different organizations were lost and not restored for sometime. This tragic event changed the worst case scenario paradigm for business continuity planning.

Today, BCP may be a part of a larger organizational effort to reduce operational risk associated with poor information security controls, and thus has a number of overlaps with the practice of risk management. However, the scope of BCP extends beyond information security only. Part of good business continuity planning includes an accurate accounting of computing assets and resources that an organization possesses. Many organizations track their hardware assets by manually placing bar code labels on computers, monitors, etc. and then scanning those labels to create an electronic record of the assets. Unfortunately, over time, this data becomes stale as computers and monitors are moved or replaced, and applications are updated, deleted, or changed out. Moreover, the process of collecting the information initially is manually intensive and prone to inaccuracies.

Accordingly, there remains a need for improved techniques in building and maintaining a current and accurate inventory of computing resources within an organization.

SUMMARY

Building and maintaining an accurate and up-to-date inventory of applications deployed throughout an organization are described. In one aspect, an application directory facilitates automated and standardized entry of information on an application. The application directory provides a series of browser-rendered interfaces that collects data about the application. Such data might include, for example, an application name, a family to which the application belongs, deployment data pertaining to deployment of the application, component data identifying components used by the application, and owner data identifying a business owner responsible for the application. These different types of data are organized according to a logical data model that defines multiple hierarchical levels of data types and relationships amongst the hierarchical levels. The collection of registered applications forms an inventory that may be used to manage these assets.

In another aspect, the application directory allows authorized users to manage the inventory of applications. The user can query, for example, the inventory to identify certain applications that satisfy the search criteria. As one example, the user may submit a request a request to identify what applications currently reside in a particular physical location of the organization. This type of knowledge allows the organization to respond quickly in the event of disaster or disruption and restore the functionality of any affected applications.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates an exemplary environment in which an architecture for building, maintaining, and managing an inventory of applications and related assets distributed throughout an organization may be implemented.

FIGS. 2-3 show renderings of an exemplary user interface to manage a portfolio of applications in the inventory. In FIG. 2, the UI facilitates entry of search criteria for applications distributed throughout the organization. In FIG. 3, the UI presents a listing of applications satisfying the submitted search criteria.

FIGS. 7-11 show a series of renderings of example interfaces to facilitate an automated and systematic registration process for registering applications being deployed in the organization.

DETAILED DESCRIPTION

This disclosure is directed to techniques for constructing, maintaining, and managing an inventory of applications and related assets distributed throughout an organization. An application is a logical set of resources including computing devices, software programs, and/or telecommunications devices that perform a specific business function. The techniques include a streamlined process for developers and managers to register applications through use of automated discovery processes for servers and locations. Also, various forms of inventory management and reporting of applications and deployments are supported. Data integrity is ensured and managed through a reconciliation process.

As a result, the inventory is kept accurate and up to date. This provides a robust information source for many different planning purposes. For instance, with such an inventory, authorized personnel can ascertain at any given time what applications are available where. In an event that a disruption impacts performance at a specific location (e.g., natural disaster, terrorist attack, etc.), members of the business continuity planning (BCP) team can quickly determine what applications are impacted and rebuild that capability at another location.

For discussion purposes, the techniques will be described in the context of an exemplary environment shown in FIG. 1. However, the techniques may be used in other environments, and be implemented using different architectures than those shown in the exemplary environment discussed below.

Exemplary Environment

Figure 1:
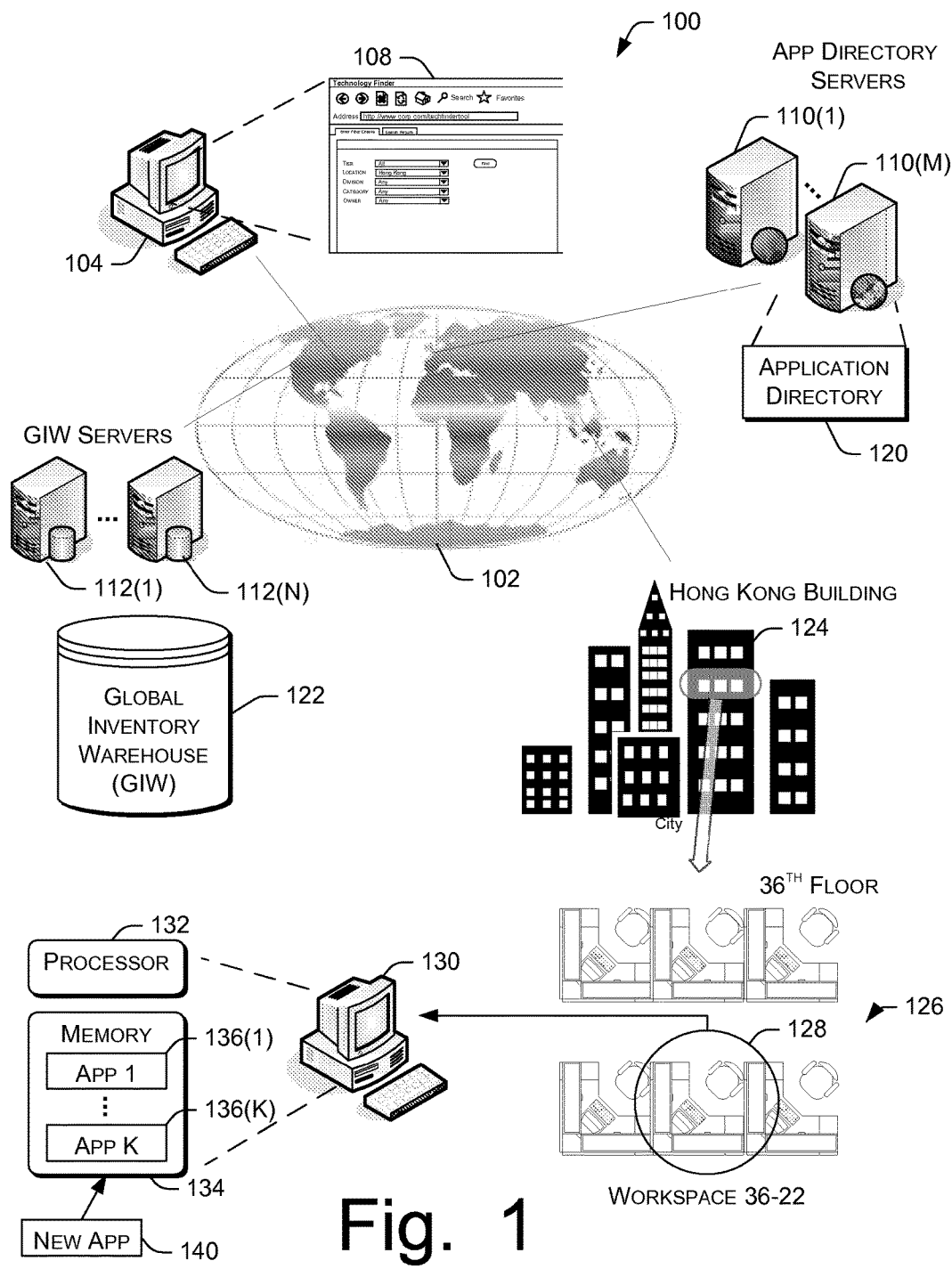

FIG. 1 illustrates an exemplary environment 100 in which an architecture for building, maintaining, and managing an inventory of applications distributed throughout an organization may be implemented. In the illustrated environment 100, the organization is a global organization with resources spread worldwide, as represented by various locations around a globe 102. The architecture enables the global organization to have knowledge of these distributed applications in the event portions of the organization experience unexpected events, such as natural disasters or human acts of terrorism, theft, arson, and so forth. An application is a logical set of resources that perform a specific business function. The resources may include computing devices, software programs, telecommunications devices, and/or any other assets or processes that together perform the business function.

By maintaining a current inventory of applications, the architecture allows authorized personnel to find answers to many interesting and diverse questions. Of particular interest, is the question of what technology is currently implemented at certain physical locations of the organization, and if something were to happen to that location, what is needed to rebuild its functionality.

To illustrate the usefulness of such an architecture, consider the environment 100 of FIG. 1 where a member of a business continuity planning (BCP) group resides in New York City. The BCP member uses a computing device 104 (e.g., a desktop PC, laptop, PDA, cell phone, etc.) to find out what applications exist at a facility in Hong Kong. The computing device 104 executes a browser or other program 108 to access remote servers over a network (not shown) to access the inventory of applications and ascertain which are located in the facility in Hong Kong. Although not shown, the network might be any number or combination of different networks, including proprietary data networks, the Internet, wireless networks, satellite networks, and the like.

Among the remote servers are one or more application directory servers 110(1), . . . , 110(M) that may reside, for example, in a different location (e.g., London) and one or more global inventory warehouse (GIW) servers 112(1), . . . , 112(N) that may reside in still another location (e.g., San Francisco). It is noted that these locations are merely illustrative, as the servers may be co-located at the same location or located in any number of places throughout the world. Furthermore, these servers may be implemented in any number of ways, including as networked servers (perhaps arranged as a server farm), a mainframe computer, or other types of computerized systems.

An application directory program 120 is installed and executed on the servers 110(1)-(M). The application directory 120 maintains an inventory of applications deployed through the organization. The application directory 120 provides a streamlined process for developers and managers to register applications through use of automated discovery processes that systematically gather various types of data about the applications, such as servers, locations, deployment details, and so on. The application directory 120 is described below in more detail with reference to FIGS. 5-13.

A global inventory warehouse (GIW) 122 is serviced by the GIW servers 112(1)-(N). The GIW 122 serves as a repository of data feeds from reconciliation and authoritative sources for the purposes of building a consolidated inventory of the organization's hardware, software, and telecommunications assets. The GIW 122 receives data from many different sources and maintains a history of the data. Further, the GIW 122 supports reporting of the information in many different views and formats. It is further noted that although the GIW 122 is shown as residing in one location (e.g., San Francisco), the GIW 122 may be distributed over multiple geographic locations and/or replicated in multiple different places to protect against single site failures.

The application directory 120 is one of the data sources for the GIW 122. When a developer registers a new application using the application directory 120, that information is first stored in an inventory database maintained by the application directory 120 and then fed to the GIW 122 for storage and organization. Authorized users (e.g., BCP members, developers, managers, etc.) can access the information in application directory 120 and GIW 122 anytime using a Web-based tool, such as the browser 108.

Continuing with our earlier scenario, suppose a user in the organization's New York office wants to know what technology is on the 36$^{th}$ floor of a building in Hong Kong. In FIG. 1, the organization's facility in Hong Kong is represented by a building 124. A portion of the 36$^{th}$ floor is shown as a collection of cubicle workspaces 126. Using computing device 104, the user can submit a request via a browser 108 for a listing of all technology housed on the 36$^{th}$ floor of building 124 in Hong Kong.

Figures 2, 3:
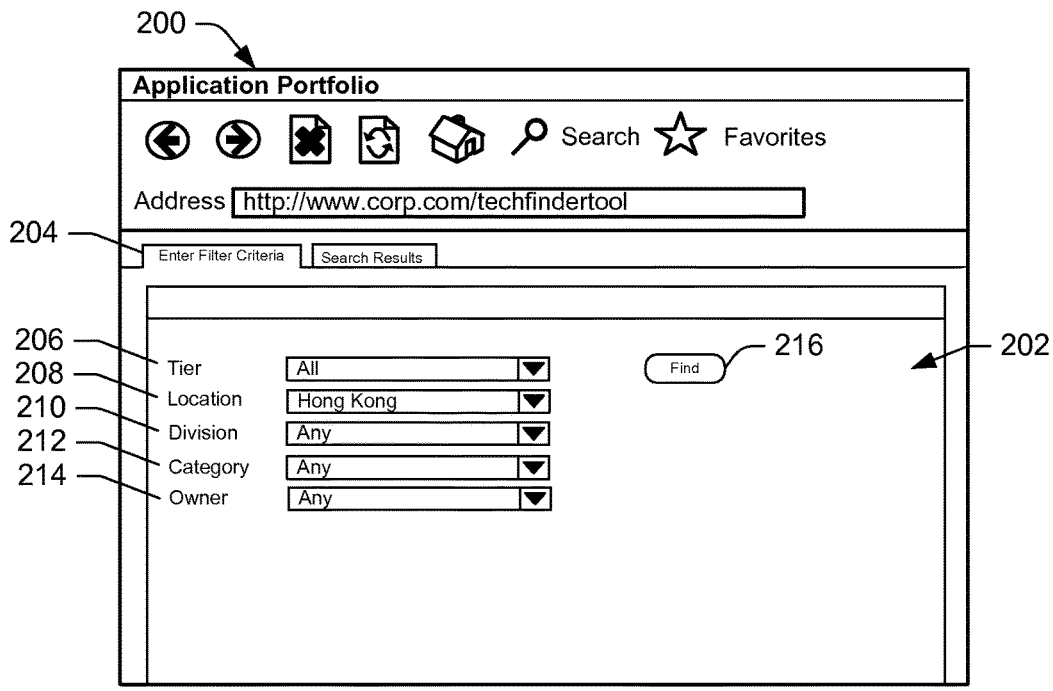

FIG. 2 shows an exemplary user interface (UI) 200 rendered on the browser 108 to facilitate a search of applications in the application inventory. In this example, the user may enter different search criteria into a search pane 202 selected by an "enter filter criteria" tab 204. The search criteria may be predefined or responsive to keyword strings entered by the user. In FIG. 2, the search pane 202 provides multiple predefined search criteria, with some predetermined values made available in pull down menus. Among the search criteria are a tier 206 that defines the criticality of the application, a location 208 at which the technology is deployed, a division 210 that uses the technology, a category 212 to which the application belongs, and an owner 214 who is responsible for the business area, development, or operations related to an application. In this particular example, the user in interested in technology in Hong Kong, so she selects Hong Kong for the location search criterion 208. Once the user selects the appropriate criteria, she may click or otherwise actuate the "Find" button 216 to submit a search query to the application directory 120 (or GIW 122).

In some implementations, the UI may facilitate entry of additional information to provide varying levels of granularity in the search. For instance, in response to the user entering the location "Hong Kong", the UI might return another pane seeking further selection criteria, such as a listing of possible buildings in Hong Kong, the floors in those buildings leased by the organizations, and even workspaces on the floors. It is further noted that other UI techniques may be employed to facilitate entry of criteria for the search request. For instance, the UI might allow the user to enter keyword phrases of one or more keywords (e.g., 37 Hong Kong computer software), or type in queries in the form of questions (e.g., "What software is installed on the computers in Hong Kong?").

With reference again to FIG. 1, the application directory servers 110(1)-110(M) receive the request from the computing device 104 and search the directory 120 for the requested information. Once found, the servers 110 format and serve the data to the user's computing device 104 in the form of a webpage report arranged, for example, in terms of hard resources (e.g., computers, keyboards, monitors, computers, network connections, etc.) and soft resources (e.g., applications, drivers, etc.).

By submitting different search requests, the user may either expand or narrow the search. For instance, the user may ask for a more expansive report of all technology in whole building 124 in Hong Kong. Conversely, the user may drill down farther and ask for information pertaining to a specific cubicle or workspace 128, such as workspace 36-22 (i.e., the $22^{nd}$ workspace on the $36^{th}$ floor) shown in FIG. 1. Continuing this latter example, suppose the target workspace includes a desktop computer 130 having a processor 132, a memory 134, and application programs 136(1), . . . , 136(K) stored in the memory. Thus, a report returned to the requesting user computing device 104 in response to a request for technology residing in workspace 36-22 might include a listing of the computer 130 (e.g., box, monitor, keyboard, mouse, etc.), processor 132, memory 134, and application programs 136(1), . . . , 136(K). These results may be presented in any configurable format.

FIG. 3 shows a rendering of an exemplary UI 300 with a listing of applications returned from the submitted search criteria. A results pane 302 selected by a "search results" tab 304 shows the various applications located in the search. In this example, in response to location parameter of "Hong Kong", a listing 306 shows those applications deployed in Hong Kong, including applications ABC and XYZ. The listing 306 may be formatted in any number of ways. Here, the listing 306 includes a tier 308, a name 310 of the technology, a unique application identifier (AID) 312, a division 314 and a location 316 in which the technology is deployed, and an owner 318 of the technology. Notice that each of the applications is in a location 316 of "Hong Kong".

With reference again to FIG. 1, the architecture shown in environment 100 facilitates this knowledge of where resources are located and who is responsible for them by collecting and maintaining an accurate, up-to-date inventory of applications. Several tools are provided to ensure reliable collection of such information when the resources are deployed.

One tool to gather information on new applications is a series of interfaces served by the application directory 120 to automate and standardize registration of newly installed applications. For instance, suppose a new application is being installed in Hong Kong, and as part of the application, a software program 140 is installed on computer 130. As part of this installation process, a responsible user (e.g., IT personnel, business owner, computer user, etc.) is tasked with registering the new application. The application directory 120 serves a series of web pages designed to gather information from the user regarding the application name, location, division, business owner, and so forth. The information entered by the user is routed over the network and stored in the application directory 120. From there, the same information (or portions of it) can be fed to the GIW servers 112 for storage in the global inventory warehouse 122.

This process is repeated each time an application is installed, upgraded, removed, or replaced on any computing system throughout the organization. Also, similar processes may be employed for hard assets, such as computers, printers, network devices, and so forth. In this manner, the GIW 122 maintains an accurate and current inventory of resources distributed throughout the organization. A more detailed discussion of collecting and maintaining this inventory is described below with reference to FIG. 4.

The ability to ascertain what resources are available where, at any given time, is beneficial for many reasons. One benefit is that knowledge of which technologies are deployed at what locations enables improved business continuity in the event of natural or human-instigated disaster. For instance, suppose a natural disaster hits Hong Kong (e.g., a tsunami, monsoon, earthquake, etc.), causing damage to a bond trading operation in Hong Kong (FIG. 1). A member of the BCP group sitting in New York would be able to quickly determine what applications have been adversely impacted and what functionality is missing. The BCP member may then reconstruct the lost resources in another location to bring the bond trading functionality back on line quickly.

Another benefit is that having an up-to-date inventory of technology assets allows for regular and timely upgrades. The architecture maintains an accurate accounting of all computers, their location, all software that is running on those computers, and the business owners that are being supported. When upgrades are scheduled to be deployed, a member of the organization's IT department can schedule the assets at various locations for software and hardware upgrades while providing sufficient time for the business owners to plan for service to be temporarily down, or to have additional resources available during the upgrade. Additionally, the IT department is able to manage asset lifecycles to timely replace certain computers and devices upon reaching an appropriate age.

An accurate inventory of computers and applications also facilitates space planning when people or departments are physically moved from one location to another. The moving team can be given a map of what resources are to be moved and re-installed at the new location. Furthermore, an accurate inventory allows the organization to more effectively monitor the security of its hardware and software assets. Such assets may also be tracked by appropriate business owners for such internal accounting as charge-backs, allocations, and provisioning and de-provisioning of assets.

Still another benefit of an accurate and up-to-date inventory is that the organization may adhere to certain deployment initiatives as well as comply with licensing agreements and support potential license negotiations.

Architecture

Figure 4:
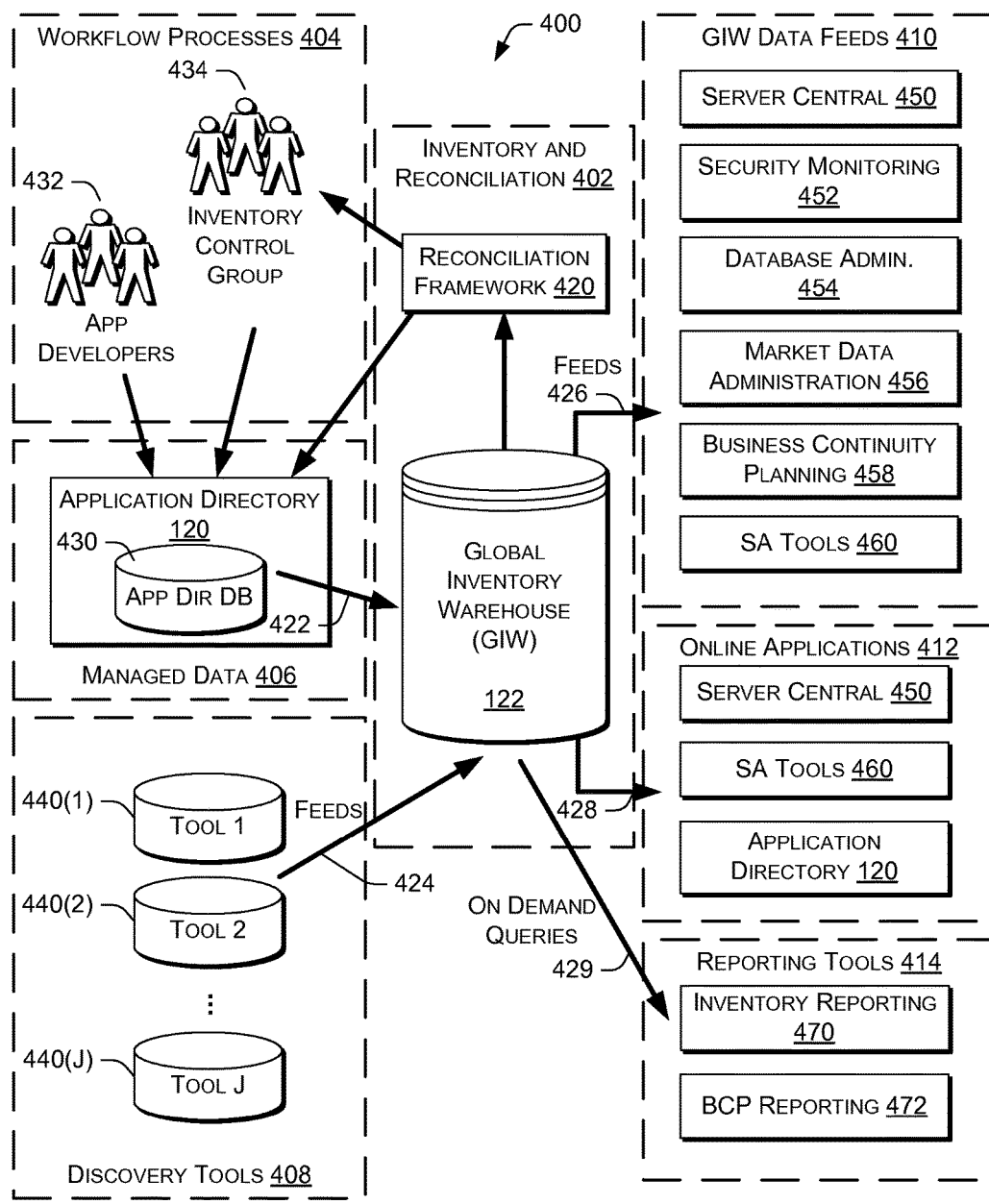
FIG. 4 illustrates one exemplary implementation of the architecture for building, maintaining, and managing an inventory of applications and data flow among various systems and processes in the architecture.

FIG. 4 shows an exemplary architecture 400 that may be implemented in the environment 100. The architecture 400 has several functional groups that together carry out the functions of inventory gathering, management, reconciliation, and reporting. The functional groups include workflow processes and automated computerized systems. In the illustrated implementation, there are seven groups: inventory and reconciliation systems 402, workflow processes 404, systems with managed data 406, discovery tools 408, systems receiving GIW data feeds 410, online applications 412, and reporting tools 414.

The inventory and reconciliation group 402 include the global inventory warehouse (GIW) 122 and a reconciliation framework 420. The GIW 122 is a repository of data collected from reconciliation and authoritative sources for purposes of building a consolidated inventory of hardware, software, and telecommunications assets. The GIW 122 receives data feeds from the managed data systems 406 and the discovery tools 408 as represented by data flow arrows 422 and 424, respectively. The GIW 122 stores and organizes the data in various data structures and formats such that selections of the data may then be fed or produced on request to other systems, applications, and tools. As shown in FIG. 4, the GIW 122 provides data feeds to a collection of systems grouped under the GIW data feeds group 410, as represented by data flow arrow 426, and also provides replies to on-demand requests to a set of online applications 412 and to various reporting tools 414, as represented by data flow arrows 428 and 429, respectively.

Data is fed into the GIW 122 from the managed data systems 406. The managed data systems capture data that is entered and managed by people according to workflow processes 404. The data in such systems does not lend itself to automatic discovery tools, such as tools 408 discussed below. Rather, the data might include information that managers enter, such as physical location, cabinet that the router sits in, and so forth.

One managed data system is the application directory 120, which serves in the architecture 400 as the authoritative inventory of applications deployed throughout the organization. The application directory 120 maintains the inventory in a repository or database 430. The database 430 organizes information relevant to the applications, such as criticality tier, unique identifier, business owner, division, location, and so on. As the authoritative system, the application directory database 430 is considered to be the most accurate and up-to-date collection of information on the applications. One exemplary implementation of the application directory 120 is described below in more detail with reference to FIG. 5.

The application directory 120 provides data on software applications to the GIW 122. The data in the application directory 120 is received from any number of sources. One source is application developers 432, who register applications with the directory 120 as part of various workflow procedures when the applications are installed or otherwise deployed. Another source is an inventory control group 434, which has management authority over the inventory maintained in the application directory database 430. The registration processes are streamlined for developers and managers to register applications with minimal manual intervention.

A third source for application-related information is the reconciliation framework 420, which updates the application directory through a validation and reconciliation process on the data maintained in the GIW 122. The reconciliation process attempts to automate handling of data validation exceptions, and feeds the reconciled information to the application directory 120. Data integrity is ensured and managed through this reconciliation process which in part populates the application directory data from the global inventory warehouse 122 feeds from the multiple discovery tools 408.

Table 1 shows an example, and non-exhaustive, list of possible data feeds into and out of the application directory 120.

TABLE 1

| System | Data | Feed Direction |
|---|---|---|
| Business Continuity Planning | Application directory data to BCP system. | OUT |
| Authorization Monitoring Project | Authorized user data. If application user changes division or leaves organization, application managers are notified to change application access accordingly. | IN/OUT |
| Marimba | Window servers and installed software | IN |
| SysInfo | Unix servers and installed software | IN |
| Red Hat Network | Package information on Linux servers | IN |
| Switch Management | Server availability and location detection | IN |
| DBDB | Database if databases (Sybase, SqlServer, UDB) | IN |
| Sonar | Server availability and location detection (base system for all servers). | IN |
| TAM | Hardware Asset Inventory. Contains the location and asset tags for all desktops, servers, printer, routers and switches. | IN |
| LifeLine | Lists for support of jobs related to applications and servers. | IN |
| Corporate Directory | Contact information for deployment managers. Application Directory stores IDs (e.g., Kerberos, GUIDs, etc.) | IN |
| OrgBud | Divisional Hierarchy for Portfolio Reporting | IN |

Other feeds that may be passed into the application directory 120 include data from a system that monitors processes and servers (e.g., HP OpenView™ system) and data from risk reporting systems.

Discovery tools 408 also provide data feeds to the GIW 122. The discovery tools 408 include multiple tools 440(1), 440(2), . . . , 440(J), which go out periodically or routinely (e.g., nightly) to gather data from the components themselves. The data is such that lends itself to automated collection without human intervention, and may involve such things as operating conditions, workload, failures, and so forth. The tools 440(1)-440(J) are representative of many possible automated data collection tools including, for example:

Marimba™—also known as Marimba Inventory—an agent used to deploy and report on packaged applications to Windows PCs.

Red Hat™ Network—an agent that runs on Linux and deploys packaged applications to Linux-based servers.

SONAR—an agent that provides IP address discovery

Switch Management—a tool that provides server availability, location detection, and network information Sysinfo—an agent that runs and reports on Unix configurations and variants Configs—a tool that provides database configuration information TAM—a tool that provides technology assets LifeLine—a tool that supports contact lists Corporate Directory—a tool that provides personnel data for employees of the organization OrgBud—a tool that provides organization hierarchy SPARC—a tool that provides department redirects GSLocation—a tool to facilitate data discovery on valid buildings, floors, rooms, and desk locations Storage Information—a tool that provides inventory of storage area networks (SANs)

The GIW provides data feeds to a variety of systems represented in group 410. Among these systems are server central 450, security monitoring 452, database administration 454, market data administration 456, business continuity planning 458, and system administration (SA) tools 460. The server central 450 is a web application that presents server inventory information from the system administrator perspective, including performance metrics information. The security monitoring system 452 is responsible for identification, engineering, and operation of solutions to monitor the security of the organization's infrastructure as well as the staff and vendors use of the systems. The database administration system 454 is responsible for management of various databases used throughout the organization. The market data administration system 456 manages an inventory of internally and client consumed market data. The business continuity planning system 458 supports many continuity solutions including crisis management, business recovery, systems and data recovery, people recovery facilities, and process improvement. The SA tools 460 are a set of tools for monitoring operation of systems from a software and hardware perspective, such as performance metrics, usage, and the like.

Online applications 412 represent another set of data consumers from the GIW 122. The online applications include the server central 450, the SA tools 460 and the application directory 120. Each of these may be implemented as Web-based tools that can query the GIW 122 for specific information. Additionally, reporting tools 414 may submit queries to the GIW 122 to generate various reports on applications deployed throughout the organization. These reporting tools 414 might include, for example, inventory reporting 470 and business continuity planning (BCP) reporting 472.

The illustrated data providers and data consumers of the information maintained in the global inventory warehouse 122 are representative. There may be number and variety of data providers and data consumers. Moreover, the data providers and consumers may be off-the-shelf products or custom built components designed specifically for the architecture or particular functions.

Application Directory

Figure 5:
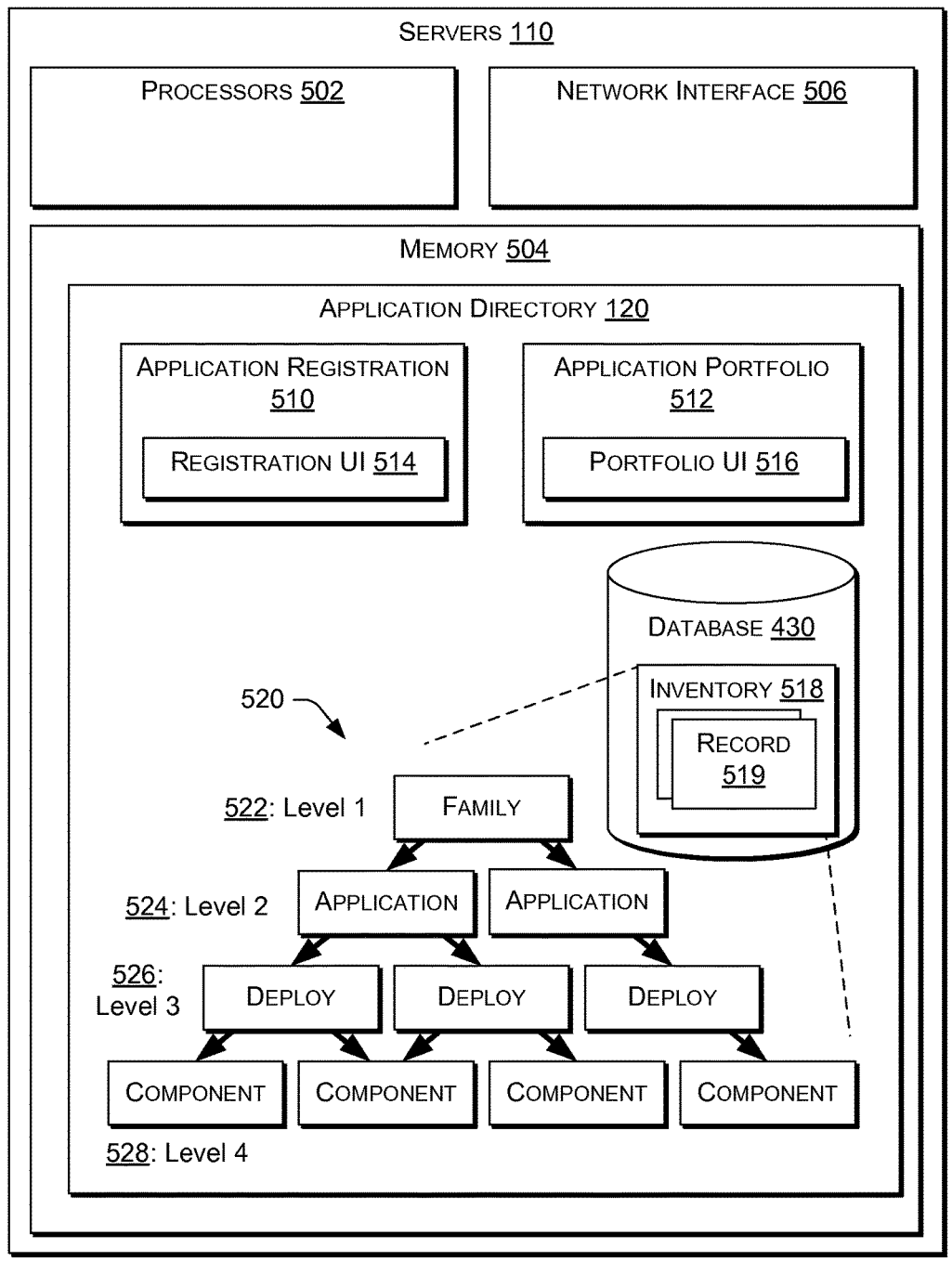
FIG. 5 is a functional block diagram of an application directory implemented on a computing system.

FIG. 5 shows one example implementation of an application directory 120 executing on one or more servers 110 (FIG. 1). The servers 110 are equipped with processing units 502 and memory 504 (e.g., volatile, non-volatile, and persistent memory). A network interface 506 provides access to and communication over a network (e.g., LAN, Internet, wireless, etc.).

The application directory 120 is shown stored in memory 504, but is executed on processing units 502 during runtime. Selected components in the application directory 120 include a repository or database 430, an application registration module 510, and an application portfolio module 512. As noted above, the application directory database 430 maintains an inventory of applications deployed throughout the organization. The application registration module 510 and the application portfolio module 512 provide Web-based tools for automated registration of applications and management of the application portfolio.

More particularly, the application registration module 510 facilitates automated registration of the applications and provides the mechanism for getting them approved for deployment. The module 510 includes a user interface (UI) 514 that guides developers and managers (and others) through the initial registration process, as well as any updates to application data in the application directory 120 and its associated checkpoints and reconciliation systems. Additionally, the application registration module 510 allows managers to approve new applications and deployments for submission to the business continuity planning (BCP) team.

The BCP team can then review and approve deployment requests using the application registration module 510. An example set of UIs for the registration process is provided below in more detail with reference to FIGS. 6-11.

The application portfolio module 512 provides the online tool for managers to generate Web-based reports against the GIW data feeds of application directory data. The data feeds may be frequent (e.g., every day, every hour, etc.), or as updated, or as needed. With this module 512, a manager may generate reports that sort or format applications by various criteria, such as by division, location, tier, category, status, and so forth. The application portfolio module 512 has a portfolio UI 516 that provides interfaces for a user to enter search criteria and presents results of the search. Two exemplary UI interfaces are shown in FIGS. 2 and 3, as described above in detail. In FIG. 2, an application portfolio UI 200 facilitates user entry of various search criteria for applications distributed throughout the organization. The interface 300 shown in FIG. 3 presents a list of all applications that satisfy the search criteria. In addition, the portfolio UI 516 aids in the management of families of applications, and allows users to define groups within individual families.

There are several possible parties who may interact with the application directory 120. Developers (e.g., firm users, code developers, support engineers), development manager (e.g., mid-level development managers responsible for support and deployment of applications), members of the business continuity planning group, and regulatory auditors are among the different classes of users who may use the application directory 120.

The application directory 120 further includes a repository or database 430 to store the applications in an organized inventory 518. The inventory 518 is composed of records 519 that store data pertaining to the applications deployed throughout the organization. Each record 519 arranges data according to a hierarchical logical data model 520 that defines multiple levels of data types and relationships amongst those levels. The hierarchical data model 520 includes a top or family level 522, a second or application level 524, a third or deployment level 526, and a fourth or component level 528.

As noted earlier, an application is a logical entity, made up of components that perform a specific business function. A family defined at the first level 522 of the data hierarchy 520 is a collection of one or more applications in the second level 524 that either perform a set of related business functions or have a common IT support structure. Each application may have one or more deployments in the third level 526. A deployment is an instance of an application that runs in a specific location. And each deployment may involve one or more components in the fourth level 528. A component is a piece of an application that shows up as an individual system process or as an individual deployable unit. It is noted that this data hierarchy 520 exemplifies just one example arrangement of a data structure. Other hierarchical models of more or fewer levels may be employed.

Figure 6:
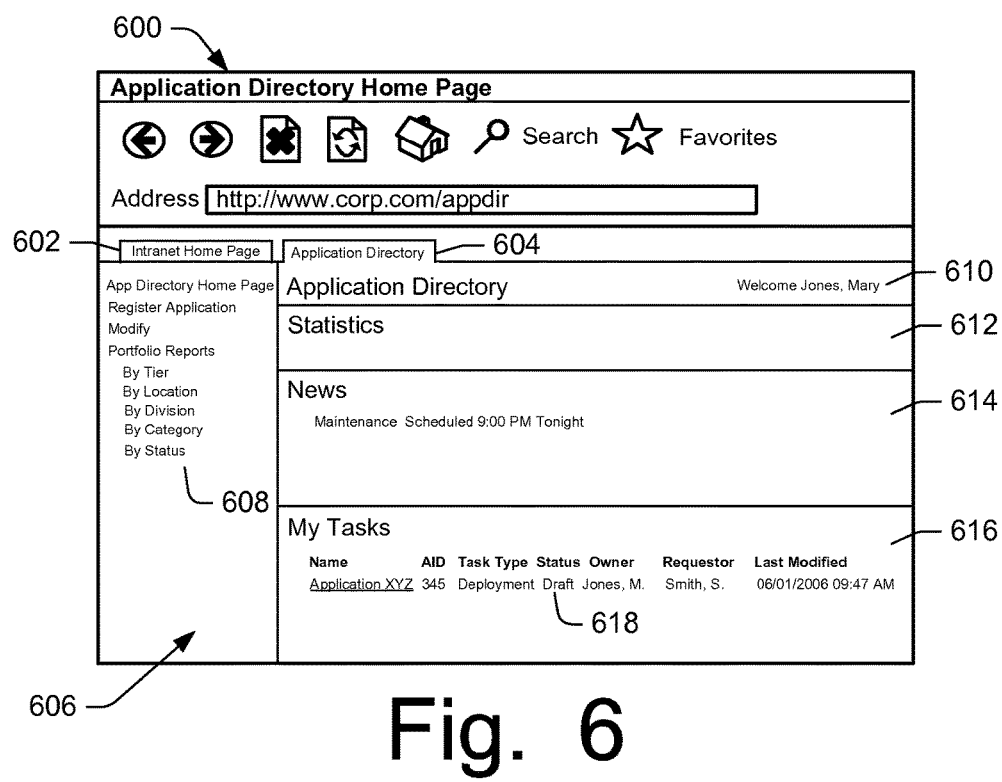
FIG. 6 is a rendering of an example home page for the application directory.

FIG. 6 shows an example home page 600 for the application directory 120. This home page 600 functions as an entry portal to the registration UI 514 and the portfolio UI 514. The home page 600 includes multiple tabbed panes including a tab 602 for access to the organization's intranet home page and a tab 604 for access to a primary pane 606 of the application directory. On this primary pane 606 are a navigation menu 608, a greeting 610 to the authorized user, a statistics area 612, a news area 614, and a task area 616.

The navigation menu 608 provides a set of links to various processes, such as registration, record modification, and reporting. To register an application, a user may access a sequence of web pages by selecting the link "Register Application" on the menu 608. Similarly, a user may generate a report of applications stored in the application directory database by choosing the "Portfolio Reports" link or one of the criteria links (e.g., "By Tier", "By Location", etc.) in menu 608.

The statistics area 612 provides a summary of the total applications, deployments and components registered. The news area 614 provides notice of any system alerts, such as enhancements, bug fixes, updates, maintenance down time, and so forth. The task area 616 provides a running list of applications to be acted upon by the user, based on that user's role. The list includes active links to an application management page that allows the user to act on the application. The link is represented by underlining in FIG. 6, although other expressions may be used such as font change, color differentiation, and so on.

The task list in area 616 further includes a status designation 618 of each open task. Table 2 provides a listing of possible statuses:

TABLE 2

| Status | Definition | Next Status |
|---|---|---|
| DRAFT | Developer is drafting a new or revision of application/deployment and has not yet submitted it to a developer manager for approval. | OPEN |
| OPEN | Developer manager is reviewing new or revision of application/deployment and has not yet submitted to BCP for approval. | PENDING or REJECTED |
| PENDING | Developer manager has submitted application for BCP approval. | ACTIVE or REJECTED |
| REJECTED | BCP or development manager has rejected application data, status is reverted to "DRAFT" for developer to review and update data for application and resubmit for developer manager and BCP approval. | DRAFT |
| ACTIVE | BCP has reviewed application data and approved application for deployment. | NA |
| EXCEPTION | Reconciliation with GIW feeds has shown discrepancies and applications are flagged as "EXCEPTION". Application data is flagged as out of date if application has not been reviewed by development team in a specified amount of time. | If data is reviewed, corrected and discrepancies are cleared, will go to DRAFT state. |
| DECOMMISSION | Legacy server or application no longer in use. | N/A |
| REPLACED | Legacy application has been replaced by new application. Reference new application identifier for replacement application. | N/A |
| INACTIVE | Legacy status - Used on inactive applications for historical purposes | NA |

Now, suppose a user would like to register a new application. The user may actuate the "Register Application" link in the menu 608. That would lead him to a series of screens to enter data about the application.

Figure 7:
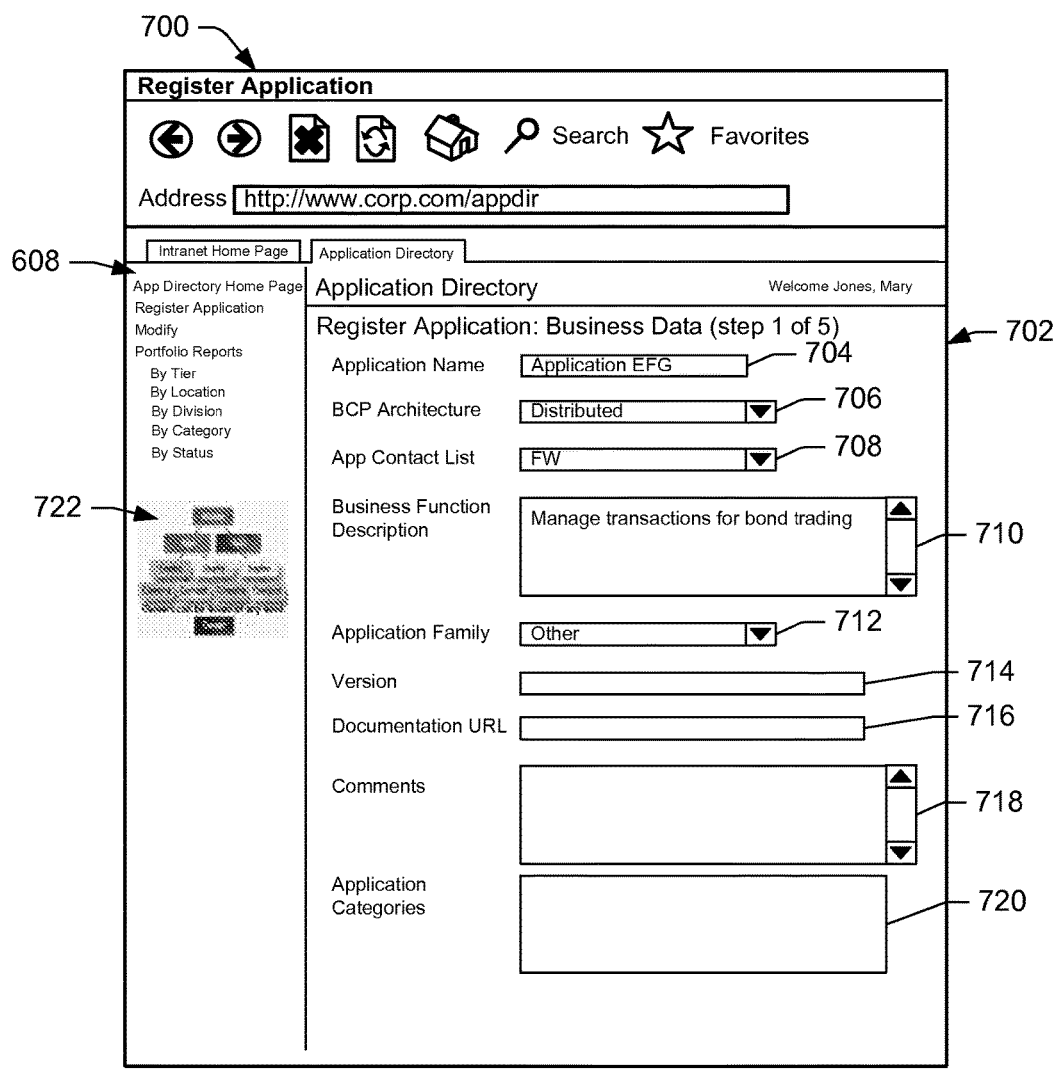

FIG. 7 shows a first registration page 700 that is initially served by the application directory 120 when a user seeks to register a new application. The registration page 700 includes a pane 702 that systematically guides the user through a series of questions about the application. The registrant enters a name for the application in entry field 704. The name may conform to standardized naming conventions, and its size may be constrained to some maximum number of characters. A BCP architecture pull down menu 706 allows the user to select a general architecture of the application, including such choices as mainframe, distributed, and mid-range.

A contact list for the application may be selected by pull down menu 708. This contact list identifies which business organizations (divisions) are primary clients of this application. In response to selection, a table of responsible owners will be automatically populated with appropriate names. A brief description of the primary business function performed by the application may be entered into field 710. Such a description may be limited to a number of words (e.g. 500 words).

The registrant selects an appropriate application family for this application using pull down menu 712. A set of predefined family names are provided in this menu, enabling the registrant to quickly find which family is the best fit for the application. A version number for the application may be entered into field 714, and document URL (universal resource locator) may be added in field 716. Any additional comments may be entered into text field 718.

Some applications may be governed by various government (federal, state, and city) regulations. For instance, applications related to financial transactions may be governed by SEC rules, federal laws, state regulations, and so forth. In field 720, the registrant may be presented with a list of possible regulation categories that might be applied to the application. The registrant can select suitable categories and the application is marked for compliance with the selected categories.

Notice also in the left margin beneath the menu 608 is a small icon 722 that provides a visual cue of the hierarchical logical data model 520. The model conveys to the registrant how data is being organized within the logical data model. A focus is also provided to illustrate which data is currently being sought from the registrant as he proceeds through the series of web pages. In this illustration, the upper two levels—family level 1 and application level 2—are in focus to visually convey that this portion of the registration concerns higher level information pertaining to the application and its family. The focus may be accomplished by changing the color of the upper two levels, or by highlighting them, or by enlarging them, or through some other graphical technique. As the registration process continues, different levels of the icon 722 will be placed in focus to assist the registrant.

FIG. 8 shows a second registration page 800 that continues the registration process. Notice that the focus in the hierarchy icon 722 has now shifted to the deployment level 3 to visually inform the registrant that this web page concerns entry of deployment information. Additional focus is on an "owner" box at the bottom of icon 722 to impart that this page 800 contains entry fields for identifying the owner of the application.

A pane 802 guides the user through a series of questions to extract deployment details. In field 804, the user enters a location (e.g., "New York") at which the application will be deployed. This location may be of any configurable granularity appropriate for the implementation, and may include floor, building, city, region, state, country, and so forth. A deployment name may be entered in field 806, and a unique application identifier (AID) 808 is automatically generated when a deployment is registered.

A tier is assigned at pull down menu 810. The tier provides a criticality rating of the deployment and ranges, for example, from 1 of low criticality to a 4 of high criticality. A next schedule test date may be entered into field 812 (or selected using a calendaring tool). These dates may include failover testing, live user testing, and the like. More than one type of test may also be scheduled by adding additional options in pane 802. The deployment manager responsible for the deployment from a technical and BCP perspective is selected in field 814. The individual chosen may be given responsibility to approve the deployment before it goes to the BCP group. One or more ROTAs may be added or removed using field 816. A collection of ROTAs (short for rotary) forms a list of contacts and preferred order and method (cell/page/call) of notifying those contacts in case an application problem occurs. It is used as reference data in the application directory, an alternate way of specifying the application deployment's contacts. Finally, a registrant may click an "Add Server" button 818 to choose servers utilized by this deployment. This action will open a new window to facilitate searching and addition of servers. The selected servers are then listed in table 820, which includes such information as a server asset tag, hostname, location, make/model, and platform.

Figure 9:
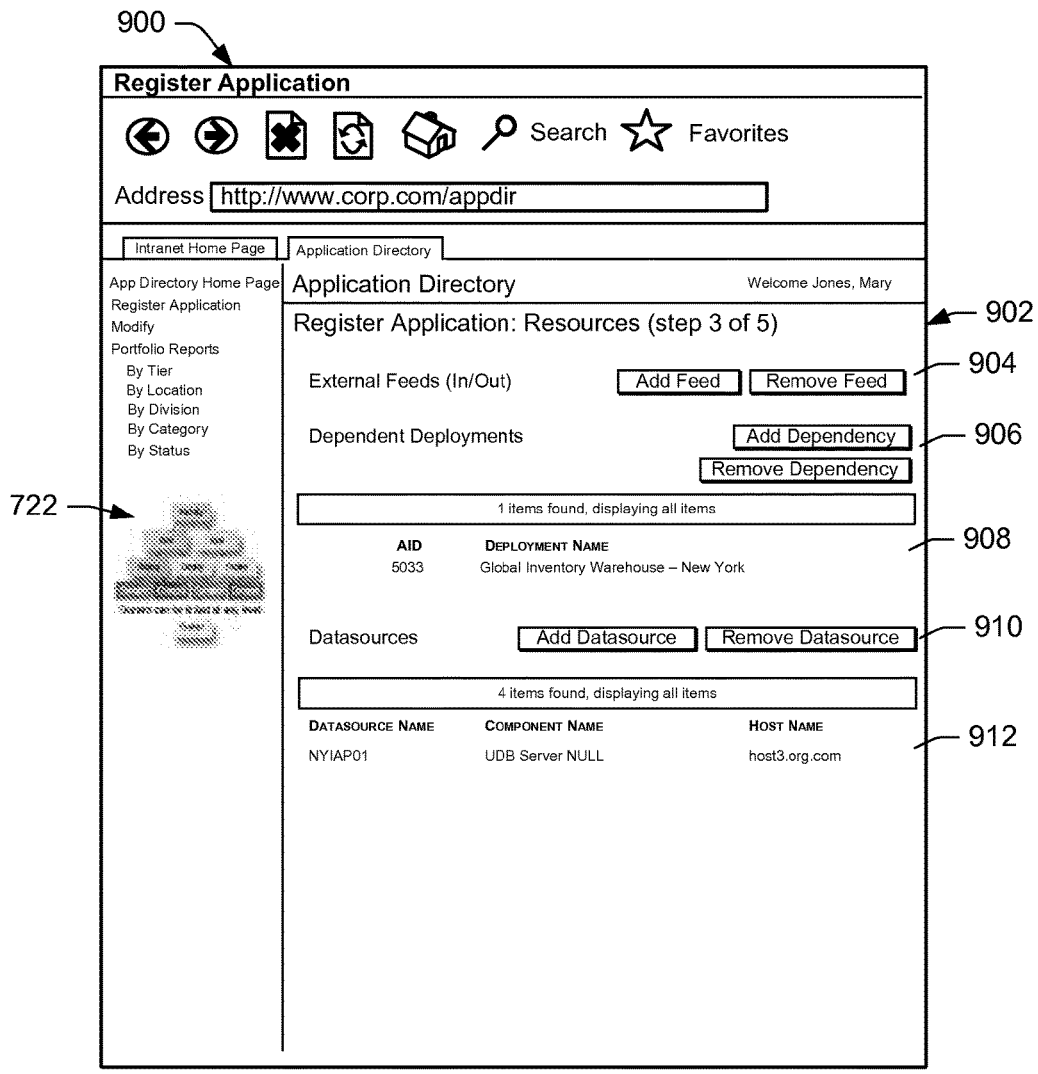

FIG. 9 shows a third registration page 900 that directs a registrant through the third step of the registration process. On this page 900, the focus of hierarchy icon 722 has shifted down to the component level 4 to visually convey that this page pertains to input of component information. A pane 902 guides the user through a series of entries regarding component information. In pane 902, the registrant may identify external data feeds in entry area 904 by clicking an "Add Feed" button to choose external feeds utilized by the application. This action will open a window that allows the user to search and add feeds. These feeds will then be depicted in a table (not shown). The user may subsequently remove feeds by actuating the "Remove Feed" button.

In entry area 906, the registrant may add any other deployments and internal feeds upon which the application is dependent. By clicking an "Add Dependency" button, a window is presented to facilitate search of dependent deployments. These deployments are listed in a dependent deployments information table 908. Any dependent deployment may be removed from the table 908 through use of the "Remove Dependency" button.

Data sources are also identified in entry area 910. Data sources include database instances and the components that run them. Actuating an "Add Datasource" button causes a window to open for searching and adding data sources to a data source information table 912. If a data source is on a server not currently associated with the deployment, selecting the data source effectively adds the server to the deployment. A "Remove Datasource" button is also provided to remove items from the table 912.

Figure 10:
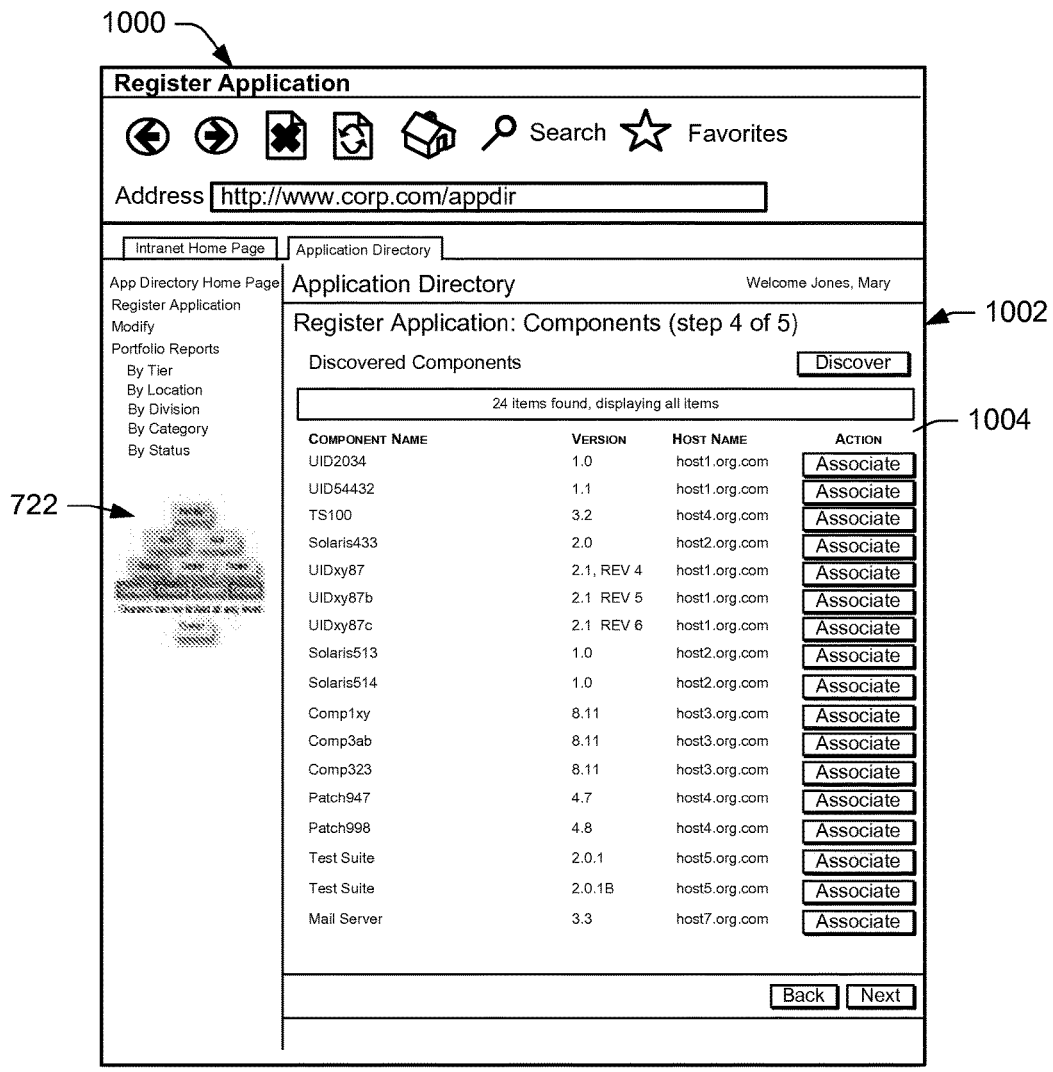

FIG. 10 shows a fourth registration page 1000 that continues entry of component detail in level 4, as noted by the visual hierarchy icon 722. A pane 1002 assists the user in discovering components relevant to the application being registered. When a user initiates the discovery process (e.g., by clicking the "Discover" button), a search query is sent to the global inventory warehouse (GIW) to return all components associated with the current deployment. These components include servers and other devices that implement the application. Components found by the search are returned and listed in a discovered components table 1004. The registrant may associate the component with the deployment by clicking an "Associate" button provided for each listed component.

FIG. 11 shows a fifth and final registration page 1100 that facilitates entry of BCP audit date in the fifth and final step in the registration process. The BCP audit date pertains to the deployment level of detail and hence, the deployment level 3 is in focus once again on the visual hierarchy icon 722. A pane 1102 guides the registrant through details of an audit for purposes of business continuity planning.

At fields 1104-1108, the user can enter dates for when the technology was tested, when user testing was completed, and when connectivity testing was conducted. Any comments relating to the BCP audit may also be provided in text entry field 1110, including such comments on the rational behind a criticality rating assigned to the application. Also via this pane 1102, the deployment of this application may be approved (by clicking the "Approve" button 1112) or rejected (by clicking the "Reject" button 1114). If approved, the application status is changed to "Active" (See Table 2 above). Conversely, if rejected, the application status is returned to "Draft" status, and the developer at this point should review the application and registration, updating all data for application deployment, and then resubmit for approval.

Registration Processes

Figure 12:
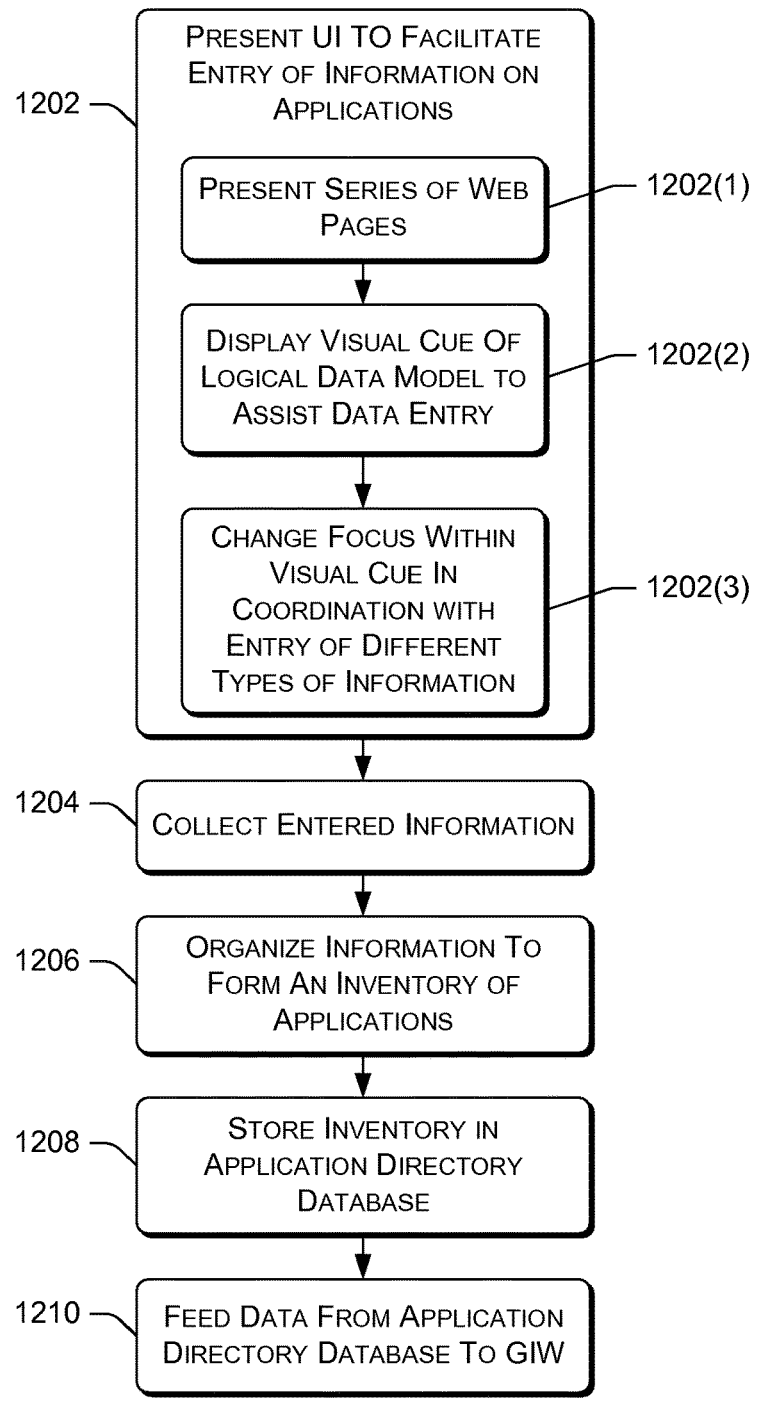
FIG. 12 is a flow diagram of an exemplary process for registering an application with the application directory.

FIG. 12 illustrates a computerized process for registering applications. This process (as well as other processes discussed herein) is illustrated as a collection of blocks in a logical flow graph, which represents a sequence of operations that can be implemented, in whole or in part, in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The sequence in which the operations are described is not intended to be construed as a limitation, and any number of the described blocks can be combined and/or rearranged in other sequences to implement the process.

For discussion purposes, the process 1200 is described with reference to the architecture, systems, and UIs of FIGS. 1-11. It is noted, however, that the processes may be implemented in many other ways.

FIG. 12 shows a computerized registration process 1200. At 1202, a user interface is presented to facilitate entry of information pertaining to an application. In one implementation, this user interface is embodied as a Web-based data entry tool that may be rendered in a browser. Accordingly, in this implementation, the first act 1202 of facilitating entry of information may consist of three actions 1202(1)-1202 (3). At 1202(1), the tool presents a series of web pages that guide the user through the registration process, collecting information about the application. One example series of web pages are described above and shown in FIGS. 6-11. These web pages are served by the application directory 120 and rendered by a browser or other rendering program.

The web pages seek entry of different types of information about the applications. The different types of information conform to the logical data model 520, which defines multiple hierarchical levels of data types and relationships amongst the hierarchical levels. At 1202(2), a visual cue representing the logical data model is depicted on the web pages to convey what data is currently being entered, and how that data is being organized in the inventory. One example visual icon is illustrated in FIGS. 7-11 as icon 722. Individual levels of the visual cue are placed in focus during the registration to aid the user during entry of the different data types to convey which data is being entered and how it is being organized within the logical data model. At 1202(3), the focus is changed within the visual cue of the logical data model in coordination with the data being collected by the web pages. As illustrated in the example of FIGS. 7-11, the focus is changed throughout the sequence of web pages.

At 1204, information pertaining to the various data types is collected during the registration process. Among the information collected are an application name, a family to which the application belongs, deployment data pertaining to deployment of the application, component data identifying components used by the application, and owner data identifying a business owner responsible for the application. Additionally, as exemplified in FIGS. 7-11, other information pertaining to the application may also be collected.

At 1206, the information is organized to form an inventory of applications. This inventory is maintained in the application directory database 430 (at 1208 in FIG. 12), and at least portions of the inventory are fed to the global inventory warehouse 122 (at 1210 in FIG. 12). In this manner, the application inventory may be viewed as being stored in two different databases—the application directory database 430 and the GIW 122.

Inventory Management Processes

Figure 13:
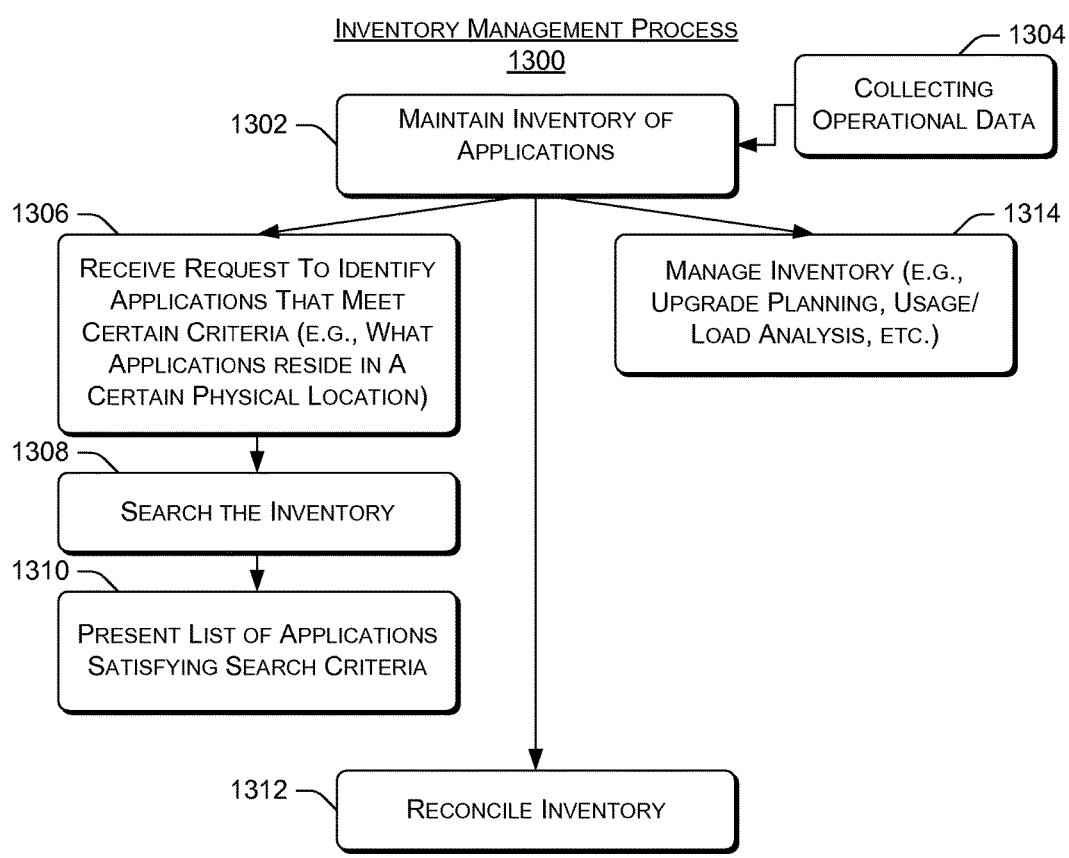
FIG. 13 is a flow diagram of an exemplary process for managing the applications in the application directory.

FIG. 13 shows a process 1300 for managing and utilizing the application directory. The process 1300 is described with reference to the architecture, systems, and UIs of FIGS. 1-11, but may be implemented in many other ways. At 1302, an inventory of applications distributed throughout an organization is maintained. In part due to the registration process, the inventory is kept up-to-date and accurately reflects the current deployment of applications in the organization. Moreover, at 1304, operational data is collected from deployed applications on an ongoing basis. Such information may be supplied by software and hardware components, and may include such data as usage, load, failure conditions, aging, and so forth. In this manner, the inventory provides a robust and current knowledge source of all applications within the organization.

The inventory may be used effectively in many different ways. Three different scenarios are shown in FIG. 13, but these scenarios are merely illustrative and are not intended to be limiting. In one scenario, authorized personnel (e.g., IT department, BCP members, developers, etc.) may mine the inventory to learn what applications are deployed in the organization. Such personnel may employ a UI to define a search of the inventory for certain applications that meet the search criteria. One example UI is illustrated in FIG. 2, where the user permitted to search by tier (i.e., criticality), location, division, category, and owner. Many other search criteria may be employed.

At 1306, the search request is received and processed. Suppose, for example, the search personnel wants to know what applications are deployed on the $36^{th}$ floor of a building in Hong Kong, as represented in the environment 100 of FIG. 1. A search request may be defined with such granularity to find all such applications that are deployed at this physical location in Hong Kong. At 1308, the inventory is searched responsive to this request. The searching may be conducted on the application directory database 430, or alternatively on the GIW 122.

At 1310, a listing of applications from the inventory that satisfy the search is presented. This listing may be presented in a UI, such as the one example shown in FIG. 3. Being able to call up all applications that meet a certain criteria is very useful in many ways. For instance, following a disruption at a particular location, the BCP team may wish identify all applications deployed in the particular location and rebuild the functionality elsewhere. As another example, space planners may need to move a department from one physical location to a new physical location. By mining the inventory to identify the applications affected by the move, the space planners can take steps to ensure the functionality is available elsewhere during this transition and minimize the time that the applications are down.

In another scenario shown in FIG. 13, authorized personnel using the reconciliation framework can reconcile records in the inventory with data from other sources in the architecture to ensure accuracy and data integrity in the inventory. Thus, at 1312, a reconciliation process may be performed on the inventory.

In still anther scenario shown in FIG. 13, different personnel may use the inventory to manage the applications at 1314. For instance, suppose the IT department wants to upgrade all applications in a systematic way. An IT team member may conduct a search for applications based on age or lifecycle criteria to identify which applications are suitable for upgrade or replacement. As another example, suppose the IT department wishes to evaluate the applications for usage and load. By maintaining an accurate and up-to-date inventory of applications, including usage and load, actions may be taken to anticipate and prevent potential problems such as application failure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   maintaining on servers an applications inventory of applications and related assets that are distributed throughout an organization, wherein the applications are a logical set of resources that together perform a specific business;

organizing the applications inventory according to a data structure having multiple levels and relationships amongst the levels;

receiving a request from a computing device to identify available applications in a particular physical location of the organization, wherein a response to the request is processed during a disruption that impacts performance in the particular physical location;

searching the applications inventory on the servers responsive to the request;

determining applications that are impacted during the disruption and application functionalities that are compromised;

presenting, on a user interface, a configurable listing of the impacted applications from the applications inventory that are available in the particular physical location of the organization;

reconstructing, using the listing of the impacted applications, the impacted applications to restore the compromised functionalities of the impacted applications, wherein the impacted applications are reconstructed to operate in a location remote to the disruption;

registering the reconstructed impacted applications, wherein registering the reconstructed impacted applications includes documenting the location remote to the disruption where the impacted applications are reconstructed to operate; and updating the applications inventory with the reconstructed impacted applications.

2. The method as recited in claim 1, wherein the applications comprise the logical set of resources including computing devices, software programs, and telecommunications devices that together perform a specific business function.

3. The method as recited in claim 1, wherein the applications inventory comprises, for each application:

information pertaining to one or more of: a family to which the application belongs, deployment data pertaining to deployment of the application, component data identifying components used by the application, and owner data identifying a business owner responsible for the application.

4. The method as recited in claim 1, wherein the data structure comprises:

a family level that defines a collection of one or more applications that one of: perform a set of related business functions or have a common support structure;

an application level that defines the applications;

a deployment level that defines instances of the applications that run in specific locations; and a component level that defines components used to implement the applications.

5. The method as recited in claim 1, further comprising storing the applications inventory in a first database, and feeding at least some data of the applications inventory to a second database.

6. The method as recited in claim 1, further comprising facilitating online registration of a new application for addition into the applications inventory.

7. A non-transitory, computer-readable medium storing computer-executable instructions that when executed by one or more processors cause the one or more processors to:

maintain an applications inventory of applications and related assets that are distributed throughout an organization, wherein the applications are a logical set of resources that together perform a specific business;

organize the applications inventory according to a data structure having multiple levels and relationships amongst the levels;

receive a request from a computing device to identify what applications are available in a particular physical location of the organization, the request associated with a disruption that impacts performance in the particular physical location;

search the applications inventory responsive to the request;

determine applications that are impacted during the disruption and application functionalities that are compromised;

present, on a user interface, a configurable listing of the impacted applications from the applications inventory that are available in the particular physical location of the organization;

reconstruct, using the configurable listing of the impacted applications, the impacted applications to restore the compromised functionalities of the impacted applications, wherein the impacted applications are reconstructed to operate in a location remote to the disruption;

register the reconstructed impacted applications, wherein registering the reconstructed impacted applications includes documenting the location remote to the disruption where the impacted applications are reconstructed to operate; and update the applications inventory with the reconstructed impacted applications.

8. A computer-implemented method, comprising:

presenting a user interface on a computing device to facilitate entry of information pertaining to an application, wherein the application comprises a logical set of resources including one or more of computing devices, software programs, or telecommunications devices that perform a specific business function;

collecting on servers, as part of the entry of information, family data describing a family to which the application belongs, deployment data pertaining to deployment of the application, component data identifying components used by the application, and owner data identifying a business owner responsible for the application;

organizing the information to form an applications inventory of applications distributed throughout an organization;

querying the applications inventory for discovery of any relevant resources to the information;

associating discovered resources with the information entered by the user;

defining the information for multiple hierarchical levels of data types and relationships amongst the hierarchical levels, wherein the defining displays a visual cue on the user interface to convey how the information is organized in the applications inventory;

providing a configurable listing of impacted applications from the applications inventory whose functionalities are impacted during a disruption and identifying the impacted functionalities; and using the listing to restore the identified impacted functionalities.

9. The computer-implemented method as recited in claim 8, wherein the deployment data comprises one or more of: a physical location of the application, a unique identifier, or a list of computing resources.

10. The computer-implemented method as recited in claim 8, wherein the component data comprises one or more of: (1) external data feeds into and out of the application, (2) other deployments upon which the deployment of the application may be dependent, or (3) a listing of the components.

11. The computer-implemented method as recited in claim 8, further comprising:
   storing the applications inventory in a database; and
   querying the database to identify applications satisfying specified criteria.

12. The computer-implemented method as recited in claim 8, further comprising ascertaining, from the applications inventory, what applications are deployed in a particular physical location.

13. The computer-implemented method as recited in claim 8, further comprising:
   storing the applications inventory in a first database; and
   feeding at least a portion of the applications inventory from the first database to a second database that maintains a global inventory of assets distributed throughout the organization.

14. A non-transitory, computer-readable medium storing computer-executable instructions that when executed by one or more processors cause the one or more processors to:
   present a user interface on a computing device to facilitate entry of information pertaining to an application, wherein the application comprises a logical set of resources including one or more of computing devices, software programs, or telecommunications devices that perform a specific business function;
   collect on servers, as part of the entry of information, family data describing a family to which the application belongs, deployment data pertaining to deployment of the application, component data identifying components used by the application, and owner data identifying a business owner responsible for the application;
   organize the information to form an applications inventory of applications distributed throughout an organization;
   query the applications inventory for discovery of any relevant resources to the information;
   associate discovered resources with the information entered by the user;
   define the information for multiple hierarchical levels of data types and relationships amongst the hierarchical levels, wherein the defining displays a visual representation of the multiple hierarchical levels of data types and the relationships on the user interface to convey how the information is organized in the applications inventory;
   provide a configurable listing of impacted applications from the applications inventory whose functionalities are impacted during a disruption and identify the impacted functionalities; and
   use the listing to restore the identified impacted functionalities.

15. A computer-implemented-method, comprising:
   facilitating entry of information pertaining to applications distributed throughout an organization using a Web-based data entry tool having a series of web pages for input of different types of information about the applications, wherein the different types of information adhere to a logical data model defining multiple hierarchical levels and relationships amongst the hierarchical levels;
   providing automatic registration of the applications for approval for deployment and management of an application portfolio, wherein a user facilitates an automated registration of the applications through an initial registration process and updates to the applications;
   displaying, by a processor, on the web pages a visual cue of the logical data model to convey how data is being organized;
   changing a focus within the visual cue of the logical data model in coordination with the information being collected by the Web-based data entry tool;
   providing, using the processor, a configurable listing of impacted applications whose functionalities are impacted during a disruption and identifying the impacted functionalities; and
   using the listing to restore the identified impacted functionalities.

16. The computer-implemented method as recited in claim 15, wherein the logical data model comprises:
   a first level that defines a collection of one or more applications that one of: perform a set of related business functions or have a common support structure;
   a second level that defines the applications;
   a third level that defines instances of the applications that run in specific locations; and
   a fourth level that defines components used to implement the applications.

17. The computer-implemented method as recited in claim 15, further comprising storing the information in a data structure defined by the logical data model to form an applications inventory of applications distributed throughout the organization.

18. A non-transitory, computer-readable medium storing computer-executable instructions that when executed by one or more processors cause the one or more processors to:
   facilitate entry of information pertaining to applications distributed throughout an organization using a Web-based data entry tool having a series of web pages for input of different types of information about the applications, wherein the different types of information adhere to a logical data model defining multiple hierarchical levels and relationships amongst the hierarchical levels;
   provide automatic registration of the applications for approval for deployment and management of an application portfolio, wherein a user facilitates an automated registration of the applications through an initial registration process and updates to the applications;
   deploy the application portfolio for business continuity planning;
   convey the multiple hierarchical levels and the relationships amongst the hierarchical levels within the logical data model, wherein conveying the multiple hierarchical levels within the logical data model comprises depicting the logical data model with a visual cue;
   change a focus within the visual cue of the logical data model in coordination with the information being collected by the Web-based data entry tool;
   provide a configurable listing of impacted applications whose functionalities are impacted during a disruption and identify the impacted functionalities, wherein the configurable listing of impacted applications comprises an indication of criticality of the impacted applications; and
   use the listing to restore the identified impacted functionalities.

19. A non-transitory, computer-readable medium storing computer-executable instructions that when executed by one or more processors cause the one or more processors to:

maintain an applications inventory of applications and related assets that are distributed throughout an organization, wherein the applications are a logical set of resources that together perform a specific business;

facilitate online registration of new applications being added to the applications inventory, the online registration including prompts for different types of information, wherein the different types of information adhere to a logical data model defining multiple hierarchical levels and relationships amongst the hierarchical levels;

provide an automatic registration of the applications for approval for deployment and management of an application portfolio, wherein a user facilitates an automated registration of the applications through an initial registration process and updates to the applications;

collect operational data in an ongoing manner from at least some of the applications in the applications inventory;

identify in real-time applications in the applications inventory that satisfy certain criteria in response to requests;

provide a configurable listing of impacted applications from the applications inventory whose functionalities are impacted during a disruption and identify the impacted functionalities;

reconstruct, using the configurable listing of the impacted applications, the impacted applications to restore the identified impacted functionalities, wherein the impacted applications are reconstructed to operate in a location remote to the disruption;

register the reconstructed impacted applications as the new applications, wherein registering the reconstructed impacted applications includes documenting the location remote to the disruption where the impacted applications are reconstructed to operate; and update the applications inventory with the reconstructed impacted applications.

20. The non-transitory, computer-readable medium as recited in claim 19, further comprising computer-executable instructions that when executed cause the one or more processors to store the applications inventory in a first database and feed at least a portion of the applications inventory to a second database.

21. The non-transitory, computer-readable medium as recited in claim 19, wherein the logical data model comprises:
a first level that defines a collection of one or more applications that one of: perform a set of related business functions or have a common support structure;
a second level that defines the applications;
a third level that defines instances of the applications that run in specific locations; and
a fourth level that defines components used to implement the applications.

22. The non-transitory, computer-readable medium as recited in claim 19, wherein the computer-executable instructions that when executed cause the one or more processors to facilitate the online registration further comprise computer-executable instructions that when executed cause the one or more processors to:
display on a series of web pages a visual cue of the logical data model to convey how data is being organized; and
change a focus within the visual cue of the logical data model in coordination with the information being collected during the online registration.

23. The non-transitory, computer-readable medium as recited in claim 19, wherein the computer-executable instructions that when executed cause the one or more processors to identify the impacted functionalities comprise computer-executable instructions that when executed cause the one or more processors to:
receive a request to identify what applications are available in a particular physical location of the organization;
search the applications inventory responsive to the request; and
present a listing of applications from the applications inventory that are available in the particular physical location of the organization.

24. A computing system comprising:
a memory; and
a processor disposed in communication with the memory and configured to execute a plurality of processing instructions stored in the memory, wherein the instructions when executed cause the processor to:
maintain an applications inventory of applications and related assets that are distributed throughout an organization, wherein the applications are a logical set of resources that together perform a specific business;
facilitate online registration of new applications being added to the applications inventory, the online registration including prompts for different types of information, wherein the different types of information adhere to a logical data model defining multiple hierarchical levels and relationships amongst the hierarchical levels;
provide an automatic registration of the applications for approval for deployment and management of an application portfolio, wherein a user facilitates an automated registration of the applications through an initial registration process and updates to the applications;
collect operational data in an ongoing manner from at least some of the applications in the applications inventory;
identify in real-time applications in the applications inventory that satisfy certain criteria in response to requests;
provide a configurable listing of impacted applications from the applications inventory whose functionalities are impacted during a disruption and identify the impacted functionalities;
reconstruct, using the configurable listing of the impacted applications, the impacted applications to restore the identified impacted functionalities, wherein the impacted applications are reconstructed to operate in a location remote to the disruption;
register the reconstructed impacted applications as the new applications, wherein registering the reconstructed impacted applications includes documenting the location remote to the disruption where the impacted applications are reconstructed to operate; and
update the applications inventory with the reconstructed impacted applications.

25. A system comprising:
a memory, wherein the memory stores a plurality of processor-executable instructions to provide an interaction interface having a plurality of interaction interface mechanisms comprising:
a first series of data entry user interfaces to facilitate user entry for an automated registration of applications deployed throughout an organization through an initial registration process and updates to the applications;

a second series of data entry interfaces to facilitate user entry of different types of information about the applications, wherein the different types of information adhere to a logical data model defining multiple hierarchical levels of information types and relationships amongst the hierarchical levels;

a visual cue representative of the logical data model displayed in conjunction with the second series of data entry interfaces to convey which data is being sought for user entry and how that data is being organized within the logical data model;

a configurable listing of applications whose functionalities are impacted during a disruption used to identify impacted functionalities and reconstruct the impacted applications to restore the impacted functionalities;

wherein the first series of data entry interfaces further facilitates registering of the reconstructed impacted applications, wherein registering the reconstructed impacted applications includes documenting the location remote to the disruption where the impacted applications are reconstructed to operate, wherein an applications inventory is updated with the reconstructed impacted applications.

26. The system as recited in claim 25, wherein the logical data model comprises:
   a first level that defines a collection of one or more applications that one of: perform a set of related business functions or have a common support structure;
   a second level that defines the applications;
   a third level that defines instances of the applications that run in specific locations; and
   a fourth level that defines components used to implement the applications.

27. The system as recited in claim 25, wherein the visual cue further includes a focus portion to represent data is being sought for user entry and a non-focused portion to represent data not currently being sought for user entry.

28. The system as recited in claim 27, wherein the focus changes within the visual cue in coordination with which data is being sought for user entry.

29. A system comprising:
   a memory;
   at least one processing unit coupled to access the memory; and
   an application directory tool stored in the memory and executable on the at least one processing unit to:
   facilitate online registration of applications deployed throughout an organization, wherein individual applications comprise a logical set of resources including one or more of computing devices, software programs, or telecommunications devices that perform a specific business function;
   provide automatic registration of the applications for approval for deployment and management of an application portfolio, wherein a user facilitates an automated registration of the applications through an initial registration process and updates to the applications, wherein the initial registration process collects different types of information that adhere to a logical data model defining multiple hierarchical levels and relationships amongst the hierarchical levels;
   deploy the application portfolio for business continuity planning purposes;
   access an applications inventory to identify where the applications that have been registered are physically deployed within the organization;
   provide a configurable listing of impacted applications from the applications inventory whose functionalities are impacted during a disruption and identify the impacted functionalities;
   reconstruct, using the configurable listing of the impacted applications, the impacted applications to restore the identified impacted functionalities, wherein the impacted applications are reconstructed to operate in a location remote to the disruption;
   register the reconstructed impacted applications, wherein registering the reconstructed impacted applications includes documenting the location remote to the disruption where the impacted applications are reconstructed to operate; and
   update the applications inventory with the reconstructed impacted applications.

30. The system as recited in claim 29, wherein the applications are stored in the applications inventory according to the logical data model.

31. The system as recited in claim 29, wherein the application directory tool presents a series of web pages for the registration, wherein individual web pages depict a visual cue of the logical data model to convey how data is being organized.

32. The system as recited in claim 31, wherein the application directory tool changes a focus within the visual cue in coordination with what information is being collected during the registration.

33. The system as recited in claim 31, wherein the logical data model comprises:
   a first level that defines a collection of one or more applications that one of: perform a set of related business functions or have a common support structure;
   a second level that defines the applications;
   a third level that defines instances of the applications that run in specific locations; and
   a fourth level that defines components used to implement the applications.

34. A system comprising:
   means for facilitating registration of applications deployed throughout an organization in an automated online manner to form an applications inventory, the registration facilitation means presenting a series of interfaces to gather systematically different types of information about the applications, wherein the different types of information adhere to a logical data model defining multiple hierarchical levels and relationships amongst the hierarchical levels;
   means for discovering applications in the applications inventory that satisfy search criteria;
   means for identifying applications in the applications inventory that are affected in an event of a disruption that impacts performance in a particular physical location of the organization;
   means for presenting a configurable listing of the affected applications in the particular physical location to restore missing functionalities of the affected applications, wherein the affected applications are reconstructed to operate in a location remote to the disruption; and
   means for registering the reconstructed affected applications, wherein registering the reconstructed affected applications includes documenting the location remote to the disruption where the affected applications are reconstructed to operate.

35. The system as recited in claim 34, wherein the logical data model comprises:
- a first level that defines a collection of one or more applications that one of: perform a set of related business functions or have a common support structure;
- a second level that defines the applications;
- a third level that defines instances of the applications that run in specific locations; and
- a fourth level that defines components used to implement the applications.

36. The system as recited in claim 34, wherein the interfaces depict a visual cue of the logical data model to convey how the information is being organized and modify a focus within the visual cue during the registration to visually convey what information is being sought.

* * * * *